United States Patent
Buyukkayhan et al.

(10) Patent No.: US 9,998,484 B1
(45) Date of Patent: Jun. 12, 2018

(54) CLASSIFYING POTENTIALLY MALICIOUS AND BENIGN SOFTWARE MODULES THROUGH SIMILARITY ANALYSIS

(71) Applicant: EMC Corporation, Hopkinton, MA (US)

(72) Inventors: Ahmet Buyukkayhan, Malden, MA (US); Zhou Li, Malden, MA (US); Alina M. Oprea, Arlington, MA (US); Martin Rosa, Quebec City (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 132 days.

(21) Appl. No.: 15/082,731

(22) Filed: Mar. 28, 2016

(51) Int. Cl.
*H04L 29/06* (2006.01)
*G06F 17/30* (2006.01)

(52) U.S. Cl.
CPC .... *H04L 63/1416* (2013.01); *G06F 17/30598* (2013.01)

(58) Field of Classification Search
None
See application file for complete search history.

(56) References Cited

U.S. PATENT DOCUMENTS

| | | | |
|---|---|---|---|
| 7,392,544 B1 | 6/2008 | Pavlyushchik | |
| 8,769,676 B1 * | 7/2014 | Kashyap | G06F 21/554 726/22 |
| 9,762,593 B1 * | 9/2017 | Kennedy | H04L 63/1416 |
| 2011/0283361 A1 * | 11/2011 | Perdisci | H04L 63/145 726/24 |
| 2017/0195178 A1 * | 7/2017 | Kaluza | H04L 41/0853 |
| 2017/0279837 A1 * | 9/2017 | Dasgupta | H04L 63/1425 |

OTHER PUBLICATIONS

A.P. Namanya et al., "Evaluation of Automated Static Analysis Tools for Malware Detection in Portable Executable Files," 31st UK Performance Engineering Workshop (UKPEW), University of Leeds, Sep. 2015, pp. 81-95.

(Continued)

*Primary Examiner* — Kaveh Abrishamkar
(74) *Attorney, Agent, or Firm* — Ryan, Mason & Lewis, LLP

(57) ABSTRACT

A method comprises obtaining at least a first software module not classified as benign or potentially malicious, extracting a set of features associated with the first software module including static, behavior and context features, computing distance metrics between the extracted feature set and feature sets of a plurality of clusters including one or more clusters of software modules previously classified as benign and exhibiting a first threshold level of similarity relative to one another and one or more clusters of software modules previously classified as potentially malicious and exhibiting a second threshold level of similarity relative to one another, classifying the first software module as belonging to a given cluster based at least in part on the computed distance metrics, and modifying access by a given client device to the first software module responsive to the given cluster being a cluster of software modules previously classified as potentially malicious.

20 Claims, 9 Drawing Sheets

(56) References Cited

OTHER PUBLICATIONS

C. Rossow et al., "Sandnet: Network Traffic Analysis of Malicious Software," First Workshop on Building Analysis Datasets and Gathering Experience Returns for Security (BADGERS), Apr. 2011, pp. 78-88, Salzburg, Austria.

I. Burguera et al., "Crowdroid: Behavior-Based Malware Detection System for Android," 1st ACM Workshop on Security and Privacy in Smartphones and Mobile Devices (SPSM), Oct. 2011, pp. 15-26.

Verizon, 2015 Data Breach Investigations Report (DBIR), available at: http://www.verizonenterprise.com/DBIR/2015/, 2015, 70 pages.

J. Tang et al., "Feature Selection for Classification: A Review," Data Classification: Algorithms and Applications, Jul. 2014, 37 pages.

M. Bailey et al., "Automated Classification and Analysis of Internet Malware," 10th International Conference on Recent Advances in Intrusion Detection (RAID), Sep. 2007, pp. 178-197.

U. Bayer et al., "Scalable, Behavior-Based Malware Clustering," 16th Annual Network and Distributed System Security Symposium (NDSS), Feb. 2009, pp. 8-11, vol. 9.

M. Dash et al., "Feature Selection for Clustering—A Filter Solution," IEEE International Conference on Data Mining (ICDM), 2002, 10 pages.

M. Ester et al., "A Density-Based Algorithm for Discovering Clusters in Large Spatial Databases with Noise," Second International Conference on Knowledge Discovery and Data Mining (KDD), Aug. 1996, pp. 226-231, vol. 96, No. 34.

X. He et al., "Laplacian Score for Feature Selection," Advances in Neural Information Processing Systems (NIPS), Dec. 2005, pp. 507-514, Vancouver, British Columbia, Canada.

X. Hu et al., "DUET: Integration of Dynamic and Static Analyses for Malware Clustering with Cluster Ensembles," 29th Annual Computer Security Applications Conference (ACSAC), 2013, pp. 79-88.

X.Hu et al., "MutantX-S: Scalable Malware Clustering Based on Static Features," USENIX Annual Technical Conference (USENIX ATC), 2013, pp. 187-198.

Mandiant, "APT1: Exposing One of China's Cyber Espionage Units," www.mandiang.com, 2013, 76 pages.

M. Neugschwandtner et al., "FORECAST—Skimming Off the Malware Cream," 27th Annual Computer Security Applications Conference (ACSAC), Dec. 2011, pp. 11-20.

Panda Security, "PandaLabs Annual Report 2014," http://press.pandasecurity.com, 2014, 37 pages.

R. Perdisci et al., "Behavioral Clustering of HTTP-Based Malware and Signature Generation Using Malicious Network Traces," 7th USENIX Symposium on Networked Systems Design and Implementation (NSDI), Apr. 2010, 14 pages.

K. Rieck et al., Automatic Analysis of Malware Behavior Using Machine Learning, Technische Universitat Berlin, Forschungsberichte der Fakultat IV—Elektrotechnik und Informatik, 2009, 30 pages.

T. Hastie et al., "The Elements of Statistical Learning: Data Mining, Inference, and Prediction", Springer 2009.

\* cited by examiner

FIG. 3

| CATEGORY | SUB-CATEGORY | FEATURE | DESCRIPTION | TYPE | MODEL |
|---|---|---|---|---|---|
| Static | Descriptive | Description | File description | String | Both |
| | | Company name | Name of company | String | Both |
| | | Imported DLLs | Name of all imported DLLs | Set | Both |
| | | Section names | Name of all section names | Set | Both |
| | Numerical | File size | Size of module | Integer | Both |
| | | PE size | Size from PE header | Integer | Both |
| | | PE timestamp | Time when PE file was created | Date | Both |
| | | Entropy | Module code entropy | Real | Both |
| | Attributes | Icon present | Is icon present? | Binary | Both |
| | | Version information present | Is version information present? | Binary | Both |
| | | PE type | Type of PE (32 or 64 bit) | Binary | Both |
| | | PE machine | Type of targeted CPU (Intel 386, AMD64 etc.) | Categorical | Both |
| | | Packed | Is module packed? | Binary | Both |
| | | .NET | Is it built with .NET? | Binary | Both |
| Behavior | File-system access | Written/Renamed executables | Avg. number of executables written/renamed | Real | EXE |
| | Process access | Created processes | Avg. number of created processes | Real | EXE |
| | | Opened processes | Avg. number of opened processes | Real | EXE |
| | Network connections | Set of domains | Set of domains connected to | Set | Both |
| | | Set of IPs | Set of IPs connected to | Set | Both |

FIG. 3 cont.

| Context | | | | | |
|---|---|---|---|---|---|
| | Module path | Path_level | Avg. number of levels in path | Real | Both |
| | | Path_System | Is located in System folder? | Real | Both |
| | | Path_Windows | Is located in Windows folder? | Real | Both |
| | | Path_ProgramFiles | Is located in ProgramFiles folder? | Real | Both |
| | | Path_ProgramData | Is located in ProgramData folder? | Real | Both |
| | | Path_AppDataLocal | Is located in AppDataLocal folder? | Real | Both |
| | | Path_AppDataRoaming | Is located in AppDataRoaming folder? | Real | Both |
| | | Path_User | Is located in user-specific folder? | Real | Both |
| | | Number executables | Avg. number of executables in same folder | Real | Both |
| | | Number non-executables | Avg. number of non-executables in same folder | Real | Both |
| | | Number sub-folders | Avg. number of sub-folders in same folder | Real | Both |
| | Destination path | Dest_SamePath | Is destination path same as the module path? | Real | EXE |
| | | Dest_DifferentPath | Is destination path different than the module path? | Real | EXE |
| | | Dest_System | Is destination in System(syswow64/system32) folder? | Real | EXE |
| | | Dest_Windows | Is destination in Windows folder? | Real | EXE |
| | | Dest_ProgramFiles | Is destination in ProgramFiles folder? | Real | EXE |
| | | Dest_ProgramData | Is destination in ProgramData folder? | Real | EXE |
| | | Dest_AppDataLocal | Is destination in AppDataLocal folder? | Real | EXE |
| | | Dest_AppDataRoaming | Is destination in AppDataRoaming folder? | Real | EXE |
| | | Dest_User | Is destination is user-specific folder? | Real | EXE |
| | | Dest_Temp | Is destination in Temp folder? | Real | EXE |
| | Metadata | Administrator | Is owner administrator? | Real | Both |
| | | Hidden attributes | Does file have hidden attributes? | Real | Both |
| | | Days since creation | Avg. days since observed on hosts | Real | Both |
| | Auto-start | Auto_Services | Does the module have auto-start for services? | Real | EXE |
| | | Auto_ServiceDLL | Does the module have auto-start for service DLL? | Real | DLL |
| | | Auto_Logon | Does the module have auto-start for logon? | Real | EXE |
| | | Auto_ScheduledTasks | Does the module have auto-start for scheduled tasks? | Real | EXE |

FIG. 4

| TYPE | DISTANCE METRIC |
|---|---|
| STRING | NORMALIZED EDIT DISTANCE |
| SET | JACCARD DISTANCE |
| REAL/INTEGER | NORMALIZED L1 DISTANCE |
| BINARY | BINARY DISTANCE |

| ALGORITHM | PRIOR KNOWLEDGE OF NUMBER OF CLUSTERS | PARAMETERS | CLUSTER SHAPES | PERFORMANCE |
|---|---|---|---|---|
| k-means | YES | NUMBER OF CLUSTERS | EVEN CLUSTERS | FAST |
| SPECTRAL CLUSTERING | YES | NUMBER OF CLUSTERS | EVEN CLUSTERS | SLOW |
| HIERARCHICAL (AGGLOMERATIVE) | NO | STOPPING CRITERIA | ARBITRARY | SLOW |
| DBSCAN | NO | MIN DENSITY AND NEIGHBORHOOD SIZE | ARBITRARY | FAST |

| FEATURE | INDEX | FEATURE EX | INDEX EX |
|---|---|---|---|
| DESCRIPTION | LENGTH(DESCRIPTION) | JAVA(TM) PLATFORM SE BINARY | 27 |
| COMPANY NAME | LENGTH(COMPANY NAME) | ORACLE CORPORATION | 18 |
| SIGNATURE | LENGTH(SIGNATURE) | ORACLE AMERICA, INC. | 20 |
| IMPORTED DLLs | SIZE(IMPORTED DLLs) | ADVAPI32.dll, USER32.dll, COMCTL32.dll, KERNEL32.dll | 4 |
| SECTION NAMES | SIZE(SECTION NAMES) | .text, .rdata, .data, .rsrc, .reloc | 5 |
| FILE SIZE | ROUND(FILE SIZE/64KB) | 176520B | 3 |

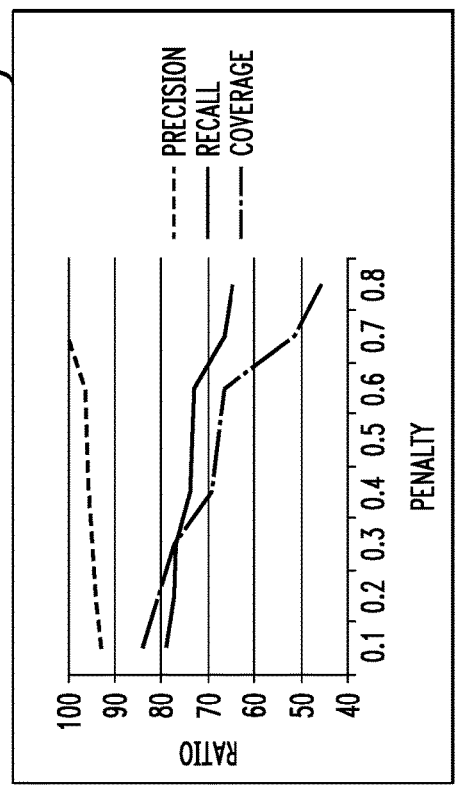

| RANK IN GENERAL MODEL | CATEGORY | FEATURE | ENTROPY IN GENERAL MODEL | ENTROPY IN EXE MODEL | ENTROPY IN DLL MODEL |
|---|---|---|---|---|---|
| 1 | STATIC | IMPORTED DLLs | 4.4 | 4.3 | 3.3 |
| 2 | STATIC | PE TIMESTAMP | 4.4 | 4.3 | 3.6 |
| 3 | CONTEXT | DAYS SINCE CREATION | 4 | 3.8 | 3.5 |
| 4 | STATIC | FILE SIZE | 3.7 | 3.8 | 2.9 |
| 5 | STATIC | PE SIZE | 3.5 | 3.4 | 3.1 |
| 6 | STATIC | SECTION NAMES | 3.2 | 3.1 | 2.5 |
| 7 | STATIC | ENTROPY | 3.1 | 2.9 | 3.1 |
| 8 | STATIC | DESCRIPTION | 2.1 | 2.3 | 1 |
| 9 | CONTEXT | PATH LEVEL | 2.1 | 2.1 | 1.7 |
| 10 | CONTEXT | NUMBER NON-EXECUTABLES | 2 | 1.7 | 2 |
| 11 | CONTEXT | NUMBER SUB-FOLDERS | 1.9 | 2 | 1.9 |
| 12 | STATIC | COMPANY NAME | 1.8 | 2 | 0.9 |
| 13 | BEHAVIOR | SET OF IPs | 1.3 | 1.2 | 1.1 |
| 14 | BEHAVIOR | CREATED PROCESSES | 1.1 | 1.4 | 0 |
| 15 | CONTEXT | AUTO LOGON | 1.1 | 1.2 | 0.9 |

US 9,998,484 B1

CLASSIFYING POTENTIALLY MALICIOUS AND BENIGN SOFTWARE MODULES THROUGH SIMILARITY ANALYSIS

FIELD

The field relates generally to security, and more particularly to detection of security threats.

BACKGROUND

Various entities are subject to different types of security threats. Some security threats relate to networking and computer security for client devices used by members of an entity, such as a business, organization or other enterprise. Malware is an example of such a security threat. Malware can pose a threat to an individual user and that user's devices, as well as possibly threatening an entity associated with the user. The emergence of exploit toolkits permits attackers to easily create new malware variants that can avoid current detection technologies. Users or members of an entity can become victims of malware-based attacks through a plethora of different infection vectors including but not limited to visiting suspicious web sites, connecting machines or devices to untrusted networks, using infected universal serial bus (USB) drives, etc.

SUMMARY

Illustrative embodiments of the present invention provide techniques for the classification of software modules, including potentially malicious software modules such as malware. Such techniques in some embodiments advantageously permit for classification of unknown software modules as belonging to one or more clusters of previously classified software modules without relying solely on signature matching or binary analysis. Accordingly, a network security system used in classification of software modules, including potentially malicious software modules, can exhibit improved performance as well as enhanced security against attacks including malware attacks.

In one embodiment, a method comprises obtaining at least a first software module not classified as benign or potentially malicious, extracting a set of features associated with the first software module, the set of features comprising one or more static features, one or more behavior features and one or more context features, computing distance metrics between the extracted feature set of the first software module and feature sets of a plurality of clusters, the plurality of clusters comprising: one or more clusters of software modules previously classified as benign and exhibiting a first threshold level of similarity relative to one another; and one or more clusters of software modules previously classified as potentially malicious and exhibiting a second threshold level of similarity relative to one another, classifying the first software module as belonging to a given one of the plurality of clusters based at least in part on the computed distance metrics, and modifying access by a given client device to the first software module responsive to the given cluster being one of the one or more clusters of software modules previously classified as potentially malicious. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIG. 3 is a table showing an example feature set in an illustrative embodiment.

FIG. 4 is a table showing examples of distance metrics for different types of features in an illustrative embodiment.

FIG. 5 is a table showing examples of different clustering algorithms in an illustrative embodiment.

FIG. 6 is a table showing an example of feature values in an illustrative embodiment.

FIG. 7 is a plot showing the change in penalty for static features in an illustrative embodiment.

FIG. 11 is a table showing a ranking of different features in an illustrative embodiment.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
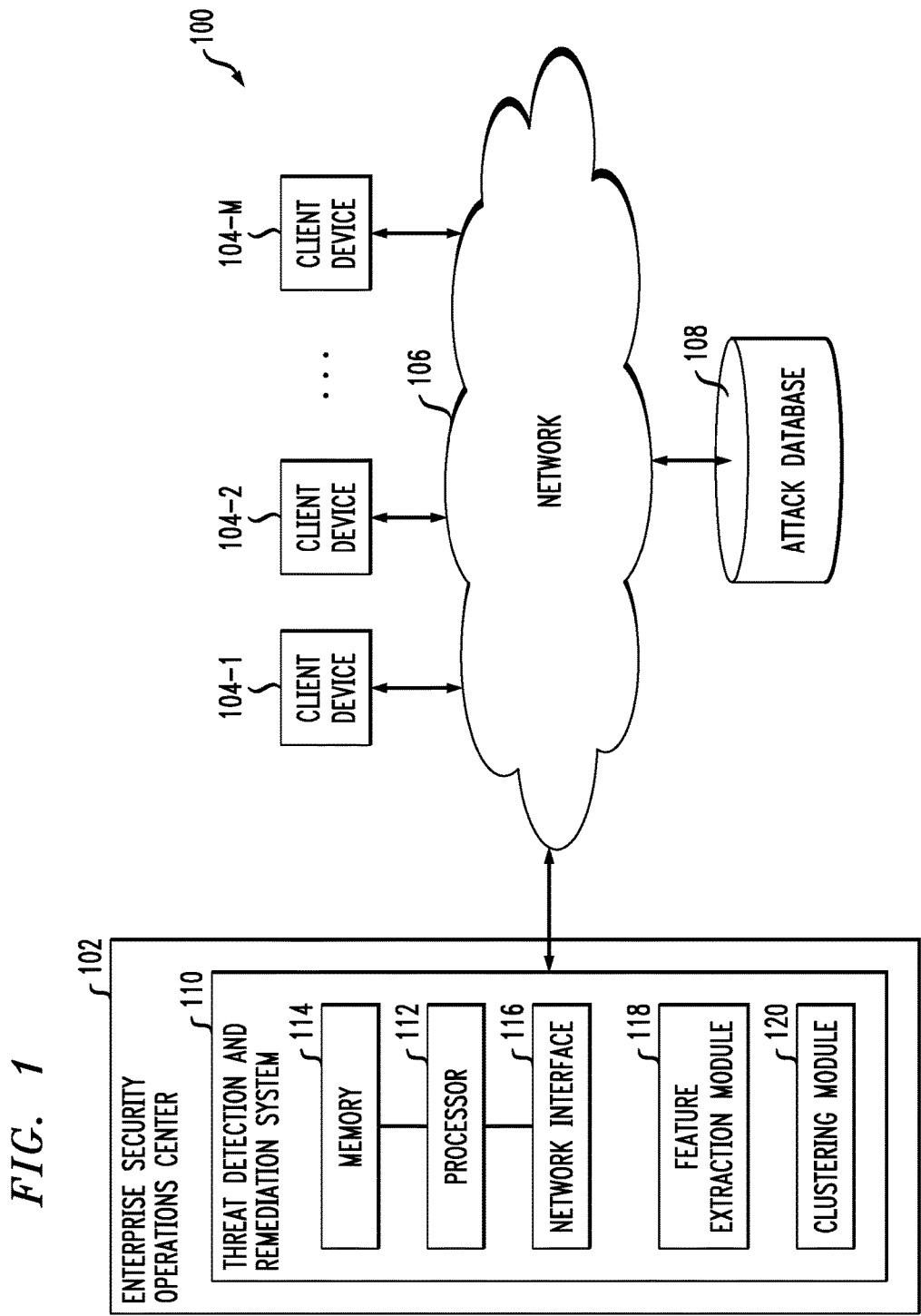
FIG. 1 is a block diagram of an information processing system for classifying software modules in an illustrative embodiment of the invention.

FIG. 1 shows a computer network 100 configured in accordance with an illustrative embodiment of the invention. The computer network 100 comprises an enterprise security operations center (SOC) 102 and a plurality of client devices 104-1, 104-2, . . . 104-M, collectively referred to herein as client devices 104. The client devices 104 are coupled to a network 106, where the network 106 in this embodiment is assumed to represent a sub-network or other related portion of the larger computer network 100. Accordingly, elements 100 and 106 are both referred to herein as examples of "networks" but the latter is assumed to be a component of the former in the context of the FIG. 1 embodiment. Also coupled to the network 100 is an attack database 108, which may store information relating to previously classified software modules including clusters of previously classified software modules exhibiting a threshold level of similarity relative to one another. In some cases, different threshold levels may be used for clustering software modules previously classified as benign and software modules previously classified as potentially malicious.

Software modules, such as executables (EXEs) and dynamic link library (DLL) modules or DLLs, may be malicious. While various embodiments are described below in the context of classifying EXEs and DLLs, embodiments are not limited solely to classifying these types of software modules. The techniques described below in the context of EXE and DLL software modules may be adapted for use with other types of software modules or more generally other types of files that are potentially malicious.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The network 106 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The attack database 108, as discussed above, is configured to store and record information relating to threats and attacks including information related to previously classified software modules. The attack database 108 may, in some embodiments, more particularly store a blacklist of known malicious or potentially malicious software modules or other information characterizing known malicious or potentially malicious software modules such as previous patterns of attack used by known malicious or potentially malicious software modules. In other embodiments, various additional or alternative information may be stored in attack database 108, such as a whitelist of known benign previously classified software modules or information associated with known benign software modules.

The attack database 108 in some embodiments is implemented using one or more storage devices associated with the enterprise SOC 102. Such storage devices may comprise, for example, storage products such as VNX® and Symmetrix VMAX®, both commercially available from EMC Corporation of Hopkinton, Mass. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 110 of the enterprise SOC 102 are provided over network 106 to client devices 104, or to a system administrator, information technology (IT) manager, or other authorized personnel via one or more security agents. Such security agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 110. For example, a given security agent may comprise a mobile telephone equipped with a mobile application configured to receive alerts from the enterprise SOC 102 or the threat detection and remediation system 110 and to provide an interface for the security agent to select particular remedial measures for responding to the alert or notification. Examples of such remedial measures may include blocking access to one or more potentially malicious software modules, removing potentially malicious software modules from one or more of the client devices 104, requiring potentially malicious software modules to be run in a sandboxed or other protected environment on one or more of the client devices 104, requiring user input or authentication to obtain or run potentially malicious software modules, etc.

It should be noted that a "security agent" as the term is generally used herein may comprise an automated entity, such as a software entity running on a processing device. Accordingly, a security agent need not be a human entity.

As shown in FIG. 1, the enterprise SOC 102 comprises threat detection and remediation system 110. As will be described in further detail below, the threat detection and remediation system 110 is configured to classify software modules, including potentially malicious software modules.

Although shown as an element of the enterprise SOC 102 in this embodiment, the threat detection and remediation system 110 in other embodiments can be implemented at least in part externally to the enterprise SOC 102, for example, as a stand-alone server, set of servers or other type of system coupled to the network 106. In some embodiments, the threat detection and remediation system 110 may be implemented at least in part within one or more of the client devices 104.

The threat detection and remediation system 110 in the FIG. 1 embodiment is assumed to be implemented using at least one processing device. Each such processing device generally comprises at least one processor and an associated memory, and implements one or more functional modules for controlling certain features of the threat detection and remediation system 110.

More particularly, the threat detection and remediation system 110 in this embodiment comprises a processor 112 coupled to a memory 114 and a network interface 116.

The processor 112 illustratively comprises a microprocessor, a microcontroller, an application-specific integrated circuit (ASIC), a field-programmable gate array (FPGA) or other type of processing circuitry, as well as portions or combinations of such circuitry elements.

The memory 114 illustratively comprises random access memory (RAM), read-only memory (ROM) or other types of memory, in any combination. The memory 114 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 116 allows the threat detection and remediation system 110 to communicate over the network 106 with the client devices 104, and illustratively comprises one or more conventional transceivers.

The processor 112 further comprises a feature extraction module 118 and a clustering module 120. The feature extraction module 118 is configured to obtain at least a first software module not classified as benign or potentially malicious, possibly from one of the client device 104. The feature extraction module 118 is also configured to extract a set of features associated with the first software module, the set of features comprising one or more static features, one or more behavior features and one or more context features. The static features may be extracted from the first software module itself, while the behavior and context features may be extracted from client devices 104.

The clustering module 120 is configured to compute distance metrics between the extracted feature set of the first software module and feature sets of a plurality of clusters. The plurality of clusters include one or more clusters of software modules previously classified as benign and exhibiting a first threshold level of similarity relative to one another, as well as one or more clusters of software modules previously classified as potentially malicious and exhibiting a second threshold level of similarity relative to one another. In some cases, the first and second threshold levels may be the same. In other cases, different threshold levels may be used for clustering benign and potentially malicious software modules. The plurality of clusters, or information associated with the plurality of clusters, may be obtained from attack database 108.

The clustering module 120 is also configured to classify the first software module as belonging to a given one of the plurality of clusters based at least in part on the computed distance metrics, and to modify access by client devices 104 to the first software module responsive to the given cluster being one of the one or more clusters of software modules previously classified as potentially malicious. Additional details regarding the feature extraction module 118 and clustering module 120 will be described in further detail below with respect to FIGS. 2-11.

It is to be appreciated that the particular arrangement of the enterprise SOC 102, threat detection and remediation system 110, feature extraction module 118 and clustering module 120 illustrated in the FIG. 1 embodiment is presented by way of example only, and alternative arrangements can be used in other embodiments. As discussed above, for example, the enterprise SOC 102, threat detection and remediation system 110, feature extraction module 118 and/or clustering module 120 may in some embodiments be implemented internal to one or more of the client devices 104. As another example, the functionality associated with the feature extraction module 118 and clustering module 120 may be combined into one module, or separated across more than two modules with the multiple modules possibly being implemented with multiple distinct processors.

At least portions of the feature extraction module 118 and clustering module 120 may be implemented at least in part in the form of software that is stored in memory 114 and executed by processor 112.

It is to be understood that the particular set of elements shown in FIG. 1 for classification of software modules is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 110 may be implemented external to enterprise SOC 102, such that the enterprise SOC 102 can be eliminated.

In some embodiments, the threat detection and remediation system 110 may be part of or otherwise associated with a system other than the enterprise SOC 102, such as, for example, a critical incident response center (CIRC).

Additionally or alternatively, the threat detection and remediation system 110 can be part of or incorporate an otherwise conventional security analytics system, such as the RSA Security Analytics system commercially available from RSA, The Security Division of EMC Corporation of Hopkinton, Mass.

Other embodiments can implement the threat detection and remediation system 110 as part of or in conjunction with a security information and event management (SIEM) system, such as the enVision® platform, also commercially available from RSA. Such an STEM system is also considered another possible example of a "network security system" as that term is broadly used herein.

The threat detection and remediation system 110 may be implemented at least in part using one or more processing platforms including public or private cloud infrastructure, or other distributed virtual infrastructure. Such a distributed virtual infrastructure may comprise, by way of example, a hypervisor platform and associated virtual processing and storage elements. An example of a commercially available hypervisor platform suitable for use in an embodiment of the invention is the VMware® vSphere™ which may include an associated management system such as vCenter™.

Other processing platforms may be used to implement threat detection and remediation system 110 in other embodiments, such as different types of virtualization infrastructure in place of or in addition to virtualization infrastructure comprising virtual machines. Such virtualization infrastructure illustratively includes container-based virtualization infrastructure configured to provide Docker containers or other types of Linux containers (LXCs).

As another example, portions of a given processing platform in some embodiments can comprise converged infrastructure such as VxRack™ or Vblock® converged infrastructure commercially available from VCE, the Virtual Computing Environment Company, an EMC Federation Company.

An exemplary process for classification of software modules will now be described in more detail with reference to the flow diagram of FIG. 2. It is to be understood that this particular process is only an example, and that additional or alternative processes for classification of software modules can be carried out in other embodiments.

In this embodiment, the process includes steps 200 through 208. These steps are assumed to be performed by the processor 112 of the threat detection and remediation system 110 utilizing feature extraction module 118 and clustering module 120. The process begins with step 200, obtaining at least a first software module not classified as benign or potentially malicious. While FIG. 2 and various embodiments are described herein with respect to a system having two classifications, benign or potentially malicious, embodiments are not so limited. In some embodiments more than two classifications are used, such as benign, adware or malware. Numerous other classifications may be used in other embodiments, including subclasses within one or more of benign, potentially malicious, adware, malware, etc.

In step 202, a set of features associated with the first software module is extracted. The set of features includes one or more static features, one or more behavior features and one or more context features. Extracting the set of features in step 202 may include extracting the static features from the first software module itself and extracting the behavior and context features from client devices 104.

Distance metrics between the extracted feature set of the first software module and feature sets of a plurality of clusters are computed in step 204. Computing the distance metrics may include assigning weights to the features extracted in step 202. The weights may, in some embodiments, be uniformly assigned. In other embodiments, the weights may be proportional to entropies of the extracted features in previously classified software modules in the plurality of clusters. In addition to assigning weights to the extracted features, penalty values may be assigned to distances between features missing from the extracted feature set of the first software module.

The plurality of clusters includes one or more clusters of software modules previously classified as benign and exhibiting a first threshold level of similarity relative to one another, and one or more clusters of software modules previously classified as potentially malicious and exhibiting a second threshold level of similarity to one another. In some cases, the first and second threshold levels of similarity are the same. In other cases, the threshold levels of similarity are different for benign and potentially malicious software modules. The FIG. 2 process may further include determining or creating the plurality of clusters. Determining the plurality of clusters includes, in some embodiments, computing pairwise distances for pairs of previously classified software modules utilizing a density-based spatial clustering of applications with noise (DBSCAN) clustering algorithm.

Pairwise distances may be computed by indexing the previously classified software modules based on a subset of the extracted features, where the subset of extracted features are numerical features. A range query is built based on the indexing, and the range query is utilized with a first threshold to retrieve a subset of the previously classified software modules in a neighborhood of a given one of the previously classified software modules. Pairwise distances between the given previously classified software module and respective ones of the retrieved previously classified software modules in the neighborhood are computed, and the given previously classified software module is clustered with one or more of the retrieved previously classified software modules having pairwise distances less than a second threshold, the second threshold being smaller than the first threshold.

Figure 2:
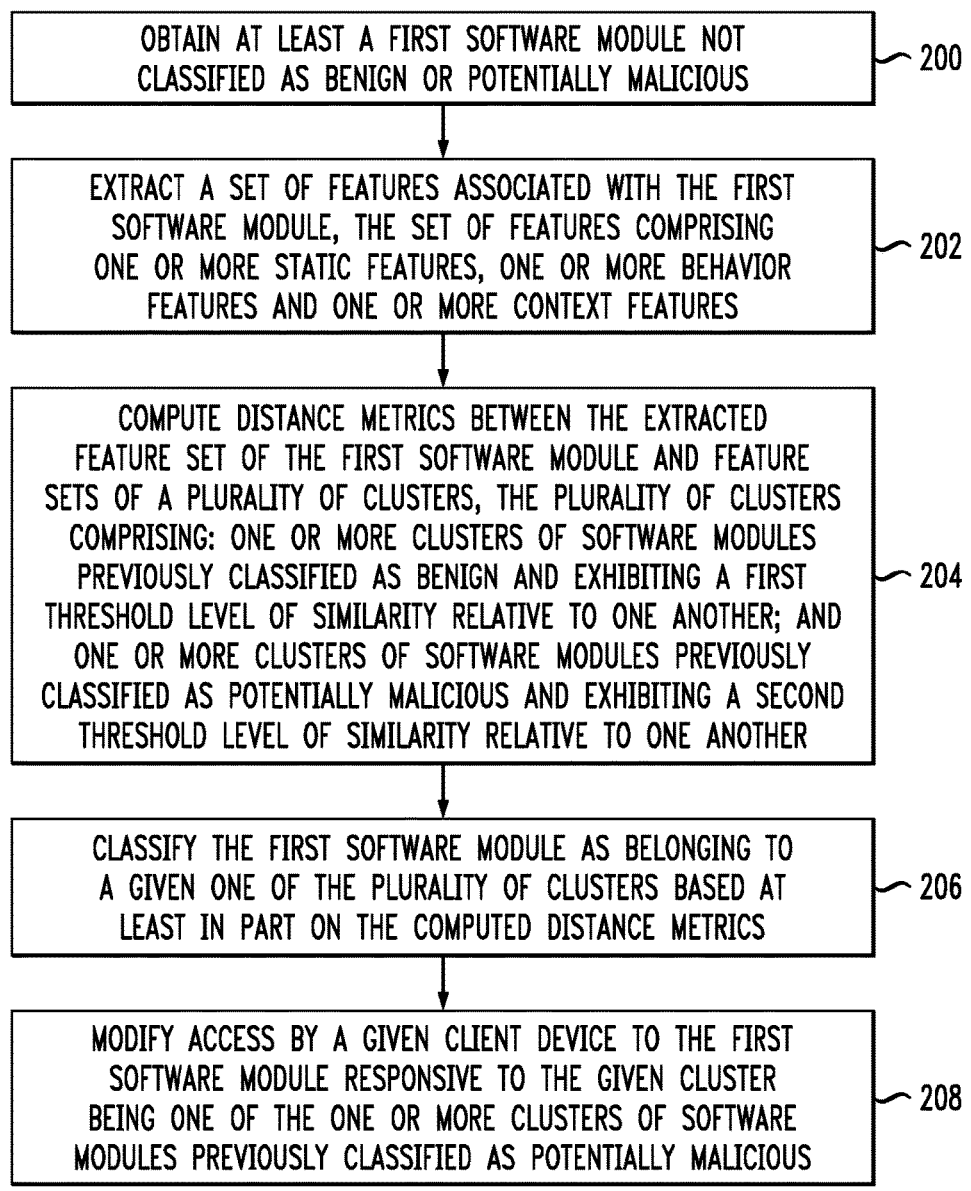
FIG. 2 is a flow diagram of an exemplary process for classification of software modules in an illustrative embodiment.

The FIG. 2 process continues with step 206, classifying the first software module as belonging to a given one of the plurality of clusters based at least in part on the distance metrics computed in step 204. Classification in step 206 may proceed as follows. First, distance metrics between static features in the extracted feature set of the first software module and corresponding static features of previously classified software modules are compared. The first software module may be classified as belonging to a given benign cluster of previously classified software modules if the distance metrics between the static features in the extracted feature set of the first software module and corresponding static features of the given benign cluster is below a given threshold.

If the distance metrics between the static features in the extracted feature set of the first software module and corresponding static features of a given potentially malicious cluster of previously classified software modules is below a first threshold, then further analysis is done using an expanded feature set including behavior and context features of the first software module in addition to static features. The first software module is classified as belonging to the given potentially malicious cluster if the distance metrics between the static features, the behavior features and the context features in the extracted feature set of the first software module and corresponding features of the given potentially malicious cluster is below a second threshold. It is important to note that the first and second thresholds in this context need not be the same as the first and second thresholds used for creating or determining the plurality of clusters or the first and second threshold similarity levels. The various thresholds and threshold levels described herein may be user-defined, learned through training or machine learning, etc.

In step 208, access by one or more of client devices 104 to the first software module is modified responsive to classifying the first software module as belonging to a cluster of software modules previously classified as potentially malicious. Modifying access by the client device to the first software module in step 208 may, in some cases, comprise removing the first software module from a memory or storage of the client device, preventing the client device from obtaining or storing the first software module in the first place, causing the first software module to be opened in a sandboxed or other protected application environment on the client device, etc.

Modifying access in step 208 may further include generating one or more notifications or alerts to send to one or more of the client devices 104, to one or more network administrators or IT professionals associated with the enterprise, etc. Transmitting the alert or other notification to the client device may utilize one or more APIs of a client device permitting remedial or preventative actions to be taken, such as deleting or quarantining the first software module, causing a pop-up, icon or other warning to be displayed on a screen of the client device warning the user of the potentially malicious nature of the first software module, etc. Transmitting the alert or other notification to the network administrator or IT professional can allow such users to grant or deny access by the client device to the first software module, possibly after further review or analysis of the first software module.

In other embodiments, modifying access in step 208 may include requiring a user of the client device to authenticate in order to access the first software module. In this manner, certain classes of users may be permitted to access potentially malicious software modules while others cannot. As an example, a class of users including IT professionals may benefit from access to potentially malicious software module to confirm whether they are malicious, to refine thresholds for future use in classifying other software modules, etc.

Malicious activities on networks such as the Internet are increasing at a staggering pace. It is estimated that 75 million new malware samples were generated in 2014, compared with 30 million new malware samples in 2013.

With the emergence of exploit toolkits, attackers can easily create new malware variants that avoid current detection schemes that rely on signature matching or simple binary analysis.

Users, such as users of client devices 104, can become victims of malware attacks through a plethora of different infection vectors, including but not limited to visiting suspicious web sites, connecting the client devices 104 to untrusted networks, using infected USB drives, opening email or email attachments, etc. As users work remotely more often, and various entities permit or encourage bring your own device (BYOD) arrangements for corporate and other types of networks, the entities themselves become indirect victims of malware or criminal activities. In some cases, entities are the targets of more advanced attacks. As an example, certain types of malware such as malware droppers or watering hole attacks may seek to infect or attack an entity by compromising client devices or users of that entity. Undetected malicious activities, as well as malicious activities that are not detected quickly, can lead to costly data breaches for entities or users.

To complement traditional security products, such as antivirus or antimalware products, some entities such as large organizations deploy host agents to monitor the activity of corporate machines including but not limited to installed applications, running processes, services, scheduled tasks, etc. The aforementioned security agents running on client devices 104 may act as the host agents. Host agents are typically used for forensic analysis after an attack has been discovered by other means. In some embodiments, as will be described in further detail below, the use of host agents can prominently improve visibility into software configurations of client devices 104, and has the potential to identify and counteract malicious activities early on.

Various embodiments are described below in the context of a host data set that was collected from 40,000 Windows machines in a large, geographically distributed organization. In this data set, a small fraction (117,000 out of 1,800,000) of software modules collected from the machines or client devices are labeled by security analysts as whitelisted, greylisted or blacklisted. In this example, whitelisted software modules are those classified as benign, greylisted software modules are those classified as adware, and blacklisted software modules are those classified as malware.

While certain embodiments are described herein in the context of clusters of software modules classified as either benign or potentially malicious, embodiments may use multiple other classifications or sub-classifications. For example, potentially malicious software modules may be further classified as adware or malware. In the data set, the large majority of the collected software modules are unclassified. Additionally, there are many different variants of the same software modules. The data set, for example, includes over 300 variants of the software module "java.exe" with different MD5 hashes. The data set also includes different malware variants that do not have consistent naming.

In some embodiments, similar software modules are grouped together to facilitate the profiling of benign software running on end hosts such as client devices 104, as well as to highlight different malware variants. Unknown software modules are classified as belonging to clusters or groups of known benign or potentially malicious software modules that exhibit threshold levels of similarity relative to one another. Similar whitelisted or benign software modules are determined, and clustered together using static features which may be extracted from a header of the software module or binary analysis. Potentially malicious software modules, including malware, are evasive in nature and may be missing certain static features. Thus, potentially malicious software modules in some embodiments are clustered by analyzing static features, behavior features related to file system accesses, process creation and network connections, and context features from a large enterprise deployment. This enlarged set of features is used to more accurately cluster potentially malicious software modules.

The clusters of benign and potentially malicious software modules are used to classify unknown software modules. Unknown software modules are labeled as benign or potentially malicious according to the closest cluster. Analysts or other users associated with enterprise SOC 102, threat detection and remediation system 110 or client devices 104 may also be provided with cluster information for use in labeling, profiling and investigating software modules.

As mentioned above, in an exemplary data set host agents were deployed on 40,000 machines or client devices. These machines are scanned periodically and the results are uploaded to a centralized server such as enterprise SOC 102 or threat detection and remediation system 110. Detailed information on the software modules running on the machines is stored for use by the enterprise SOC 102 and/or threat detection and remediation system 110. This information may be stored internal to enterprise SOC 102 and/or threat detection and remediation system 110, in attack database 108, at least partially in both, or in another data store, database or storage device.

The data set referred to herein is a snapshot of 1,800,000 software modules having different MD5 hashes, of which approximately 117,000 were manually labeled by a human analyst as whitelisted/benign (108,000), greylisted/adware (8,800) or blacklisted/malware (534). The remaining software modules are unclassified, including lesser-known software modules and variants of known software modules. In total, the data set included software modules with 301,000 distinct file names.

A relatively small set of static features extracted from the software modules themselves is used to cluster benign software modules. For potentially malicious software modules, which in this context refers to greylisted and blacklisted software modules, a large number of the static features used in clustering benign software modules are missing. In addition, potentially malicious software modules such as adware and malware can easily change such static features. Thus, an expanded set of features is utilized for clustering potentially malicious software modules, including: (1) an enlarged set of static features; (2) behavior features relating to file system access, process creation and network connections made; and (3) context features relating to the context of a software module on a given machine such as one of client devices 104. Context features include, by way of example, a path of a file, a type of folder, a number of other files in the folder, file owner, context related to files accessed or created by the software module, etc. Detailed examples of static, behavior and context features will be described below.

Similarity or dissimilarity between software modules may be defined using distance functions. In some embodiments, similar software modules should have smaller distances (e.g., 0) and increase (e.g., up to 1) for dissimilar software modules. The distance between two software modules may be defined as a weighted sum of distances on every feature. The weights may sum to 1, be expressed as percentages, or some other scale. Different distance functions may be used for individual features. For example, Jaccard distance may be used for sets, edit distance may be used for strings, L1 distance may be used for numerical values, binary distance may be used for binary values, etc. Feature weights may be assigned using various techniques. In some embodiments, uniform weights are utilized. In other embodiments, weights are proportional to the amount of entropy of each feature in the data set, where high similarity on features with high variability are given higher weights in establishing overall similarity between software modules.

In some embodiments, an optimized implementation of a DBSCAN clustering algorithm is used. In a typical implementation of DBSCAN and other clustering algorithms, the pairwise distance between all points needs to be provided. Software modules, however, have small neighborhoods defined as the set of software modules at a certain threshold distance. Accordingly, embodiments do not need to compute distance between all pairs of software modules—only between those software modules that are in the same neighborhood. In the optimized DBSCAN clustering algorithm used in some embodiments, indices are maintained on several dimensions or features that permit construction of a coarse-grained, expanded neighborhood for each software module. The optimized DBSCAN clustering algorithm only considers points in the expanded neighborhood and computes distances from a software module to those points to determine the neighborhood. The optimized DBSCAN clustering algorithm can scale for use with hundreds of thousands of software modules.

An optimal set of parameters or features for use in clustering is determined based on ground truths of manually clustered software modules. Unknown software modules can then be classified as belonging to a cluster of similar previously classified software modules. Unknown software modules that are similar to a cluster of software modules previously classified as potentially malicious may be further investigated, possibly by an expert human security analyst.

Feature selection will now be described in further detail. Each software module may be represented as a multi-dimensional feature vector, with individual features denoting different static, behavior or context attributes of a software module.

In some embodiments, a small number of static features extracted from the module's portable executable (PE) header are used for whitelisted modules. This limited set of static features may include, by way of example, file description, company name, signature, file size, set of imported DLLs, a set of section names, etc. File name itself may also be used in some embodiments.

For blacklisted or greylisted modules, the limited set of static features used for whitelisted modules may not be sufficient. For example, some of the static features, such as description, company and signature, may be missing from potentially malicious software modules such as adware or malware. In the sample data set including 534 blacklisted modules, 367 of the blacklisted modules were missing at least two fields. Moreover, static features can be easily modified by an attacker in an attempt to mimic well-known benign software modules. As such, some embodiments utilize a larger set of features including behavior features and context features and possibly additional static features. While a larger set of features can be more resilient against common evasion techniques used by authors of malware and other potentially malicious software modules, some feature experience high variability even in the same malware family or cluster. For example, the amount of network traffic sent and received by a software module may be heavily dependent on time and the client device on which it is installed or running, and therefore may be not be especially useful for determining module similarity. In some cases, however, the amount of network traffic may be used for determining module similarity. In addition to features experiencing high variability, other potentially useful features may be missing or otherwise unavailable and thus may be excluded from use in certain implementations.

Static features used in the expanded set of features extracted from software modules include descriptive features, numerical features and binary features. Descriptive features include, by way of example, features represented as string values such as description and company name as well as sets such as the names of imported DLLs and section names, etc. Numerical features include, by way of example, file size, PE size, PE timestamp, module entropy, etc. Binary features denote different module attributes including, by way of example, signature present, signature valid, icon present, version information present, PE type (e.g., 32 or 64 bit), PE machine type (e.g., Intel 386, AMD64 etc.), module packed, module uses the Windows native API, module is compiled with .NET framework, etc.

Behavior features used in the expanded feature set include file system access features, process access features, and network connections features. File system access features include, by way of example, executable files created, deleted or renamed, files read, physical or logical drives opened, etc. Process access features include, by way of example, regular process, browser or OS process opened, process or remote threads created, etc. Network connections features include, by way of example, a set of domains and IP addresses that the module connects to, the number of unique domains and IP addresses that the module connects to, etc. Various ones of the file system, process access and network connection features may be numerical features, such as counting the number of events with unique destinations per machine. For each event, the full path of both the source file or process and the destination file or process may also be used as behavior features. Since the same software module may be installed on multiple machines or client devices, the average number of events per machine may be used for such features.

Host agents on the client devices 104 may collect information representing the context of the software module. For example, host agents may collect information about the time when a module is initially observed on every machine, its full file system path for installation, the user account that created the module, and the full path of all files and processes captured by the behavior events initiated by the module. The file system path of a module may be parsed so as to assign the module to different categories such as Windows, Systems, Program Files, ProgramData, AppDataLocal, AppDataRoaming, user-specific, etc. Additionally, the host agents may monitor whether modules have auto-start functionality (e.g., whether a module can run without being invoked by a user) and categorizes the auto-start functionality into different types such as logon, services, service DLL, boot, startup, scheduled task, etc. The host agents may also monitor or collect information relating to the user name owning the module and categorize the user name as an administrator, trusted installer, regular user, etc.

Context features may be extracted from the information collected by the host agents. Context features include file system path features, path of destination features, metadata features, auto-start functionality features, etc. File system path features include, by way of example, the number of directory levels in the path, the path category, the number of other executable and non-executable files in the same folder, the number of sub-folders, etc. The path of destination events features include, by way of example, the path category of destination files extracted from behavior events, number of events that are in the same and in different paths from the source module, etc. File metadata features include, by way of example, file owner, hidden attributes, days of creation, etc. Auto-start functionality features include, by way of example, whether the module has auto-start functionality, the type of auto-start enabled, etc.

For certain path-related features, binary features for different path categories such as Windows, Systems, Program Files, etc. are created. A path might have multiple binary features enabled, for example, the module may be in both Systems and Windows paths. Similarly, binary features may be created for each type of auto-start capability, for different types of owner accounts, etc. Numerical features and binary features may be averaged across all client devices installing a software module.

FIG. 3 shows an example table 300 of an expanded set of features that may be used in some embodiments. It is to be appreciated, however, that embodiments are not limited solely to use with the specific set of features shown in table 300. Other embodiments may use more or fewer than all of the features shown in table 300. Table 300 includes a column "Model" with values of both, EXE or DLL for respective ones of the features. As will be described in further detail below, the feature set used may depend on the type of software module, e.g., executables (EXEs) and DLLs. Some features are useful for both EXEs and DLLs and thus have the value both in the model column, while other features are more useful for just EXEs or just DLLs and this is reflected in the model column value for those features. As an example, the AutoServiceDLL feature is specific to DLL software modules. A number of other features, including various behavior and context features, are specific to EXE software modules. In some embodiments, performance may be enhanced by using feature sets specific to the type of software module. In other embodiments, however, the same feature set may be used for all types of software modules.

After feature selection, similarity and distance metrics are defined for software modules. Two software modules at a small distance from one another are considered as belonging to the same family or cluster, e.g., benign or malicious.

In some embodiments, standardized distance metrics are used for the features according to the feature's type. FIG. 4 shows a table 400 summarizing distance metrics used for each feature type. For string values, a normalized edit distance is used. Normalized edit distance may be defined as the edit distance divided by the length of a maximum string. For set values, Jaccard distance is used. Jaccard distance between two sets A and B may be defined as |A∩B|/|A∪B|. For real and integer values, a normalized L1 distance is used. Normalized L1 distance may be defined as $d(x,y)=|x-y|/\max\{x,y\}$. For binary values, binary distance is used. Binary distance may be defined as $d(x, y)=1$, if $x=y$, and $d(x, y)=0$, otherwise. The distance between two software modules $M_1=(x_1, \ldots, x_n)$ and $M_2=(y_1, \ldots, y_n)$ is a weighted sum of distances for individual features:

$$d(M_1, M_2) = \sum_{i=1}^{n} w_i d(x_i, y_i), \text{ where } \sum_{i=1}^{n} w_i = 1.$$

The weights $w_i$ will be discussed in further detail below.

Respective ones of the features may have different contributions to overall similarity between software modules. In some embodiments, weights are chosen uniformly across all features, $w_i=1/n$, where n is the total number of features. In other embodiments, feature weights are chosen proportional to the feature's entropy. Feature entropy may be computed from a data set of software modules, such as all previously classified software modules, all software modules including previously classified and unknown software modules, a training data set, etc. Selecting feature weights proportional to entropy reflects an intuition that features with higher variance or entropy should contribute more to distance metrics. Weighting features by variance, entropy or information gain may be used in machine learning, including for filter-based feature selection that depends on data distribution. Weighting features may also be performed in a wrapper-based method that is dependent on the particular machine learning algorithm used.

For various software modules, some features may be missing. In particular, a large fraction of behavior features may not be available for every software module. Some embodiments set the distance between missing features to 0. In other embodiments, the distance between missing feature values is set to a penalty value. The penalty value may be fixed and common for each feature, or may be specific to each feature or feature type (e.g., static, behavior and context). For example, higher penalty values may be assigned to missing static features relative to missing behavior features. Higher penalty values result in lower similarity when computing distance metrics, and thus the penalty value should be carefully calibrated for an acceptable tradeoff. Examples of penalty values and penalty value selection will be described in further detail below.

For determining similarity between software modules, some embodiments group software modules at a small distance from one another into a same cluster. Various clustering algorithms may be utilized. FIG. 5 shows a table 500 detailing various features of different possible clustering algorithms, including k-means, spectral clustering, hierarchical or agglomerative, and DBSCAN. DBSCAN provides several advantages, as it does not require the number of clusters to be specified in advance, it can find arbitrarily shaped clusters, and it can be optimized to scale to large data sets.

DBSCAN is a density-based algorithm which creates clusters starting from core samples, which are points that are in regions of high density in the feature space. Formally, a core sample is defined as a point that has min_sample points in its neighborhood of size ε. Thus, the DBSCAN clustering algorithm is parameterized with min_sample (also referred to as minimum density) and ε (also referred to as neighborhood size). The DBSCAN clustering algorithm proceeds iteratively by identifying core samples, creating clusters starting from a core sample and successively expanding the clusters by adding all neighborhood points.

Implementations of clustering algorithms such as DBSCAN normally require calculation of pairwise distances between all points or software modules. The running time for such implementations thus increases quadratically and becomes impractical for a data set with a large number of software modules. In the sample data set referred to above, it was observed that data is sparse when using the full feature set shown in table 300 and thus computing pairwise distance between all software modules is not necessary. Instead, some embodiments compute the exact distance only between modules that relatively close or in the same neighborhood region.

To define a software module's neighborhood region, software modules are indexed based on a set of numerical features. An exemplary set of such numerical features includes length of the description name, length of the company name, size of imported DLLs, the multiple of the size of a file chunk, etc. FIG. 6 more particular shows a table 600 of features used in indexing a sample file java.exe. The software modules in the same neighborhood region should be close in such features. Indexing based on these features allows for building a range query in which only the points that belong to a given software module's neighborhood region are retrieved. Computation of distance based on the small set of numerical features is extremely efficient relative to distance computation considering all possible features. For example, edit distance computations for string values for long strings are slow relative to distance computations (e.g., L1 distance and/or binary distance) for numerical features.

After numerical indexes are calculated, each dimension is normalized to have zero mean and unit variance. This ensures that each index dimension contributes equally to the range query. A k-d tree which represents points in k-dimensional space is built with these normalized indexes and allows range queries to be performed. The range query requires a distance parameter d to define a node's neighborhood, similar to the DBSCAN algorithm which uses ε to determine the maximum distance between the points in a cluster. To avoid similar modules being filtered out in this stage, d is selected to be greater than the ε parameter used in DBSCAN to cover a larger region. In some embodiments, d is selected to be a few times greater than ε.

In an optimized DBSCAN algorithm used in some embodiments, a node's ε-neighborhood in DBSCAN is computed as follows. The ε-neighborhood is defined as all points a distance s from the node. First, all software modules in the node's region are retrieved using a range query with parameter d. For all retrieved points, a distance to the initial software module is computed. The DBSCAN ε-neighborhood is thus the set of points at distance less than ε. The remainder of the optimized algorithm may proceed in a manner similar to a standard DBSCAN algorithm.

To compute clusters of similar software modules, previously classified modules are used. For example, a set of whitelisted or benign modules and a set of blacklisted or potentially malicious modules may be used. Feature weights may be computed as uniform values or proportional to the entropy in the data set of whitelisted and blacklisted modules. In some embodiments, individual feature weights may be adjusted or refined by a user. Different values of parameters used in the above-described optimized DBSCAN algorithm may be used. Described below are example parameters used to optimize certain metrics of interest such as precision, recall, F1 score, coverage, etc. using a sample data set. It is to be appreciated, however, that the specific examples of parameter values given below are presented by way of example only and that embodiments are not limited solely to use with the particular examples given. In addition, the optimization of metrics may vary based on the data set used.

As detailed below, analyzing the sample data set leads to a conclusion that certain advantages may be obtained by using different models for different types of software modules, e.g., using one model for EXEs and another for DLLs. In addition, using weights proportional to feature entropy also provides advantages. Embodiments, however, need not use separate models for different software module types or weights proportional to feature entropy. In some cases, the use of a single model or the use of normal weights may lead to simplicity and increased computation speed relative to the use of separate models for different software module types or calculating weights proportional to feature entropy. Clusters are generated for previously-classified software modules, and unknown software modules are classified as belonging to one of the existing clusters if the distance is less than parameter ε. Various types of clusters may be used. In some embodiments, whitelisted or benign clusters and blacklisted or potentially malicious clusters are used. In other embodiments, additional clusters may be used, such as greylisted or adware clusters.

As mentioned above, the sample data set included 367 blacklisted software modules. To evaluate the metrics of interest, these blacklisted modules were manually clustered after filtering out ones that had several missing fields. Expert analysis was used to create clusters of similar modules based on domain expertise to create ground truth. In particular, labels returned from antivirus software and the similarity between binary code, file names and metadata were important factors for deciding whether two of the software modules should be grouped together. After running the optimized DBSCAN clustering algorithm, each cluster was labeled according to the majority label from the ground truth. The following metrics are defined for measuring results:

1. True Positives (TP): Number of software modules that are placed correctly in clusters according to ground truth;
2. False Positives (FP): Number of software modules that are placed incorrectly according to ground truth;
3. False Negatives (FN): Number of software modules that should belong to a cluster, but were placed in a different cluster;
4. Precision=TP/(TP+FP);
5. Recall=TP/(TP+FN);
6. F1 score=2×Precision×Recall/(Precision+Recall);
7. Coverage: Fraction of software modules that were in a cluster of size at least 2 (not considering the single-clusters in the ground truth).

When defining these metrics, the TP, FP and FN are first defined per cluster then aggregated across clusters.

Different parameters for the optimized DBSCAN algorithm were selected and tested using the above-described sample set of blacklisted modules, which included 367 software modules total with 273 EXEs and 94 DLLs. The optimized DBSCAN algorithm was run with both static features only, and all the features listed in table 300. The optimized DBSCAN algorithm was also run with uniform feature weights and entropy-based feature weights. The min_sample parameter was set at 2, while the parameter ε was varied between 0.05 and 0.3 and the penalty value for missing features was varied in the range [0.1, 0.8] at intervals of 0.01.

FIG. 7 shows a plot 700 showing the change in penalty value for static features with uniform weights when ε is fixed at 0.09. The plot 700 is representative for other values of ε. With the sample data set, a penalty value of 0.3 gives best results for static features only, while a penalty value of 0.1 gives best results when all features are considered. Generally, a smaller penalty value would be selected as more features are considered. Particularly, many modules have missing behavior features and a high penalty would result in a large distance. Optimal penalty values are lower when behavior features are considered.

Figure 8:
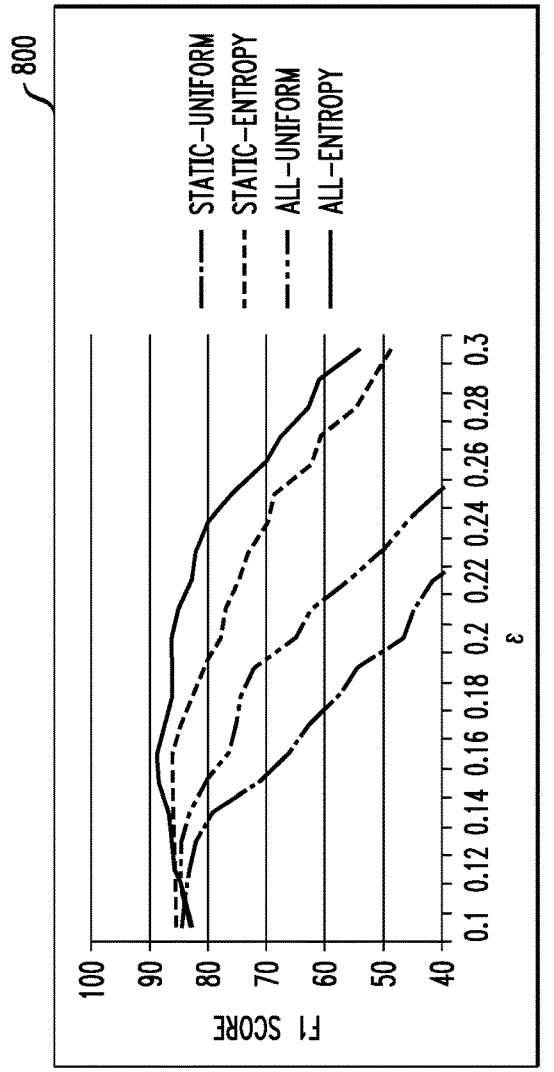
FIG. 8 is a plot and table showing performance using different feature sets in an illustrative embodiment.

FIG. 8 shows a plot 800 showing F1 score as a function of ε for four scenarios: static features with uniform weights (static-uniform), static features with weights proportional to entropy (static-entropy), all features with uniform weights (all-uniform) and all features with weights proportional to entropy (all-entropy). In this context, all features refers to the expanded feature set including static, behavior and context features shown in table 300. For uniform weights, the optimal ε value is slightly larger (approximately 0.17) when all features are considered compared to static features only (approximately 0.13). When the expanded feature set is used, the value of the neighborhood size in a cluster is enlarged to account for more noise in feature vectors.

FIG. 8 also shows table 802, which shows metrics of interest for optimal F1 scores on the four models (static-uniform, static-entropy, all-uniform and all-entropy) in the plot 800. Several observations based on comparing these models are shown below. Again, it is important to note that the particular values shown are based on the sample data set used, and that the optimal values may change based on the data set used for model comparison.

A first observation from plot 800 and table 802 is that models using feature weights proportional to feature entropy outperforms models with uniform feature weights. This is particularly the case when comparing the models which utilize the expanded feature set, all-uniform and all-entropy. A second observation from plot 800 and table 802 is that adding behavior and context features, or using the expanded feature set, improves recall for the models which utilize weights proportional to feature entropy. Precision and coverage also improves for the models which utilize weights proportional to feature entropy.

Figure 9:
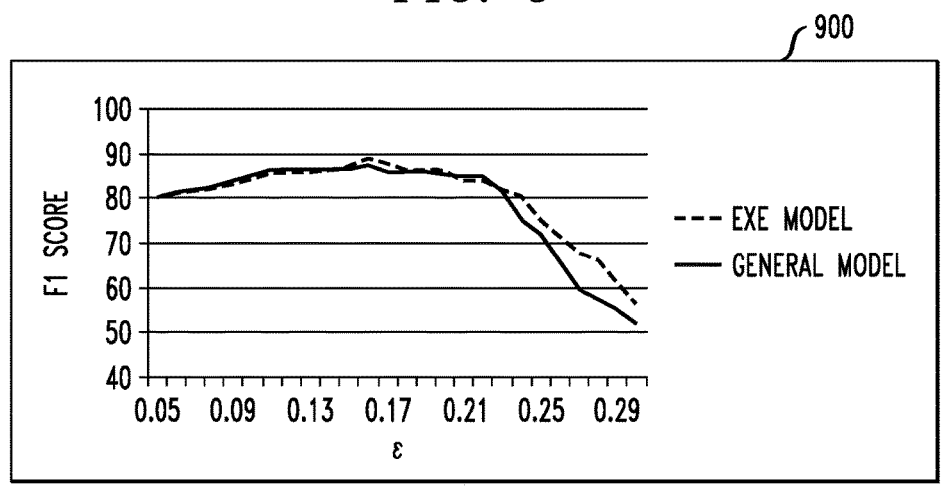
FIG. 9 is a plot showing the effects of utilizing a feature set specific to executable software modules in an illustrative embodiment.
Figure 10:
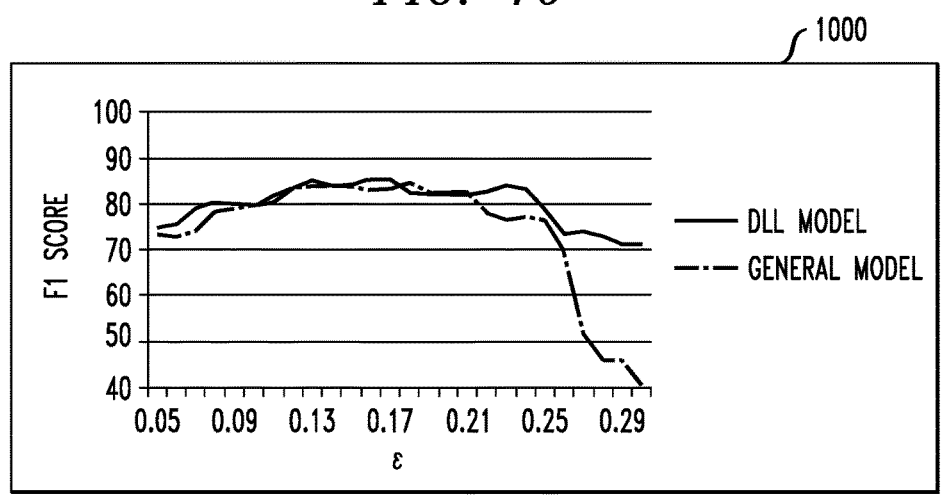
FIG. 10 is a plot showing the effects of utilizing a feature set specific to dynamic link library software modules in an illustrative embodiment.

Plots 700 and 800 evaluate the performance of models which utilize the same feature sets for all types of software modules. As mentioned above, in some contexts it may be advantageous to use distinct feature sets for different types of software modules such as EXEs and DLLs. The model column in table 300 indicates examples of different features used for EXE-specific and DLL-specific models in some embodiments. FIG. 9 shows a plot 900 comparing the general model to an EXE-specific model, where the F1 score is plotted as a function of ε. FIG. 10 shows a plot 1000 comparing the general model to a DLL-specific model, where F1 score is plotted as a function of ε. In both plot 900 and plot 1000, the penalty value is 0.1.

Different features in a feature set have different impacts on computing module similarity. FIG. 11 shows a table 1100 ranking the top 15 features according to their entropy in the general model. For comparison, the table 1100 also shows entropy in the EXE model and DLL model for the top 15 features. One observation is that many of the top features are static features, although there are some behavior and context features highly ranked as well. The entropies in the EXE and DLL models are similar to the general model, but do not have the same rankings. The behavior feature "created processes" is weighted 0 in the DLL model since this feature is not available in DLL software modules. The features "PE timestamp" and "days since creation" are created using a bin of 7 days, and the "file size" and "PE size" features are computed using 64 KB bins.

Based on the above observations, optimal blacklisted clusters were created with the all-entropy models for DLL and EXE software modules, with ε=0.16 and the penalty value set at 0.1. The list of 1,700,000 unknown software modules in the sample data set was than compared to the blacklisted clusters. As an optimization, the distance in the all-entropy model between static features of the unknown software modules was compared with static features of the blacklisted software modules. Unknown software modules that are at a distance larger than ε on the subset of static features from all blacklisted modules are discarded, since they will have overall distance greater than ε from all blacklisted modules. After this filtering step, 1,741 unknown EXEs and 2,391 unknown DLLs remained.

Next, for the remaining unknown software modules, the distance between the expanded feature set for the unknown modules and the corresponding expanded feature set of the blacklisted modules was computed. If an unknown software module is within the distance threshold ε to any blacklisted module, then that unknown software module is considered to be similar to that blacklisted module. The unknown software module, however, is still compared with remaining blacklisted modules so as to find a best fit or most similar blacklisted module. The distance between the unknown software module and the most similar blacklisted module is used as a similarity score. A distance of 0 is the highest similarity score meaning that all the features of the two modules are identical. After this processing, the number of unknown EXEs is reduced to 238 and the number of unknown DLLs is reduced to 638.

To verify the above results, external intelligence and internal antivirus scan results from the end hosts were utilized. VirusTotal, public and free online file/URL scanning service, was used as external intelligence. VirtusTotal reported 24 out of 326 unknown executables and 464 out of 638 unknown DLLs as suspicious. The low match on unknown EXEs results from the unknown EXEs not being submitted to VirusTotal and/or VirusTotal not providing a report back. When combining VirusTotal with the internal antivirus results, 238 out of 326 unknown EXEs and 549 out of 638 unknown DLLs were identified as suspicious, corresponding to a precision of 73% and 86%, respectively.

While certain examples were described above in the context of using only whitelisted or benign and blacklisted or potentially malicious software modules, embodiments are not so limited. For example, clusters may be created for greylisted or adware software modules. Various other labels for clusters may be used. The use of additional labels such as greylisted can reduce the number of modules with unknown status thereby improving calculation speed and accuracy.

The sample data set discussed above was collected from a set of Windows machines, but embodiments are not so limited. In some embodiments, client devices or hosts of software modules may be other platforms such as Mac OS, Linux, Android, etc. in addition to or instead of Windows machines. Feature sets may be customized according to the platform type.

In addition to or as an alternative to using static, behavior and context features, some embodiments may utilize indicator of compromise (IOC) features. IOCs can be defined as rules created by a domain expert to detect activities of interest with varying degrees of suspiciousness. Examples of IOCs include unsigned write(s) executable to important Windows directories, unsigned run key(s) present once in an environment, autorun unsigned DLL(s) loaded in more than a threshold (e.g., 10) processes, modifies services ImagePath, unsigned create process(es) on SVCHOST, hooks audio output, etc. IOCs may be considered as an extension or category of behavioral features. IOCs not only capture general behaviors that a software module performs (e.g., written/renamed executables, created/opened processes, etc.) but also capture specific suspicious behavior and as such may provide advantages in clustering potentially malicious files. IOCs are generally more precise than other types of behavior features, and can capture complex relations and correlations that other types of behavior features cannot. Jaccard distance may be used to compute distance metrics for IOCs.

Clustering software modules may, in some cases, be based on traces collected from a controlled environment, such as virtual machines (e.g., sandboxing) or code parsers. Embodiments, however, can process data collected from real-world enterprise hosts or client devices, which presents a number of challenges. A given software module, for example, may behave distinctly on different hosts, where noise and missing attributes are frequently observed. The techniques described herein address these issues by combining the use of static, behavior and context features and performing optimized clustering using weights dynamically adjusted based on the available data.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, notifications, alerts and other features can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
    obtaining at least a first software module not classified as benign or potentially malicious;
    extracting a set of features associated with the first software module, the set of features comprising one or more static features, one or more behavior features and one or more context features;
    computing distance metrics between the extracted feature set of the first software module and feature sets of a plurality of clusters, the plurality of clusters comprising: one or more clusters of software modules previously classified as benign and exhibiting a first threshold level of similarity relative to one another; and one or more clusters of software modules previously classified as potentially malicious and exhibiting a second threshold level of similarity relative to one another;
    classifying the first software module as belonging to a given one of the plurality of clusters based at least in part on the computed distance metrics; and
    modifying access by a given client device to the first software module responsive to the given cluster being one of the one or more clusters of software modules previously classified as potentially malicious;
    wherein the method is performed by at least one processing device comprising a processor coupled to a memory; and
    wherein extracting the set of features associated with the first software module comprises:
        extracting the one or more static features from the first software module; and
        obtaining the one or more behavior features and the one or more context features of the first software module from at least one of a plurality of client devices on which the first software module is installed.

2. The method of claim 1 wherein the processing device comprises a network security system configured to communicate with a plurality of client devices, including the given client device, over at least one network.

3. The method of claim 1 wherein the first software module comprises one of: an executable module; and a dynamic link library module.

4. The method of claim 1 wherein the one or more static features comprise:
    one or more descriptive features;
    one or more numerical features; and
    one or more binary features.

5. The method of claim 1 wherein the one or more behavior features comprise:
    one or more file system access features;
    one or more process access features; and
    one or more network connection features.

6. The method of claim 1 wherein the one or more context features comprise:
    one or more file system path features;
    one or more path of destination events features;
    one or more file metadata features; and
    one or more auto-start functionality features.

7. The method of claim 1 wherein computing the distance metrics comprises one or more of:
    utilizing a normalized edit distance for respective ones of the extracted features represented as string values;
    utilizing a Jaccard distance for respective ones of the extracted features represented as sets;
    utilizing a normalized L1 distance for respective ones of the extracted features represented as real or integer values; and
    utilizing binary distance for respective ones of the extracted features represented as binary values.

8. The method of claim 1 wherein computing the distance metrics comprises assigning weights to distance between the extracted features, the weights being proportional to entropies of the extracted features in previously classified software modules in the plurality of clusters.

9. The method of claim 1 wherein computing the distance metrics comprises assigning a penalty value to distances between features missing from the extracted feature set of the first software module.

10. The method of claim 1 further comprising determining the plurality of clusters by computing pairwise distances for pairs of previously classified software modules utilizing a density-based spatial clustering of applications with noise (DBSCAN) clustering algorithm.

11. The method of claim 10 wherein computing the pairwise distances comprises:
    indexing the previously classified software modules based on a subset of the extracted features, the subset of extracted features being numerical features;
    building a range query based on the indexing;
    utilizing the range query with a first threshold to retrieve a subset of the previously classified software modules in a neighborhood of a given one of the previously classified software modules;
    computing pairwise distances between the given previously classified software module and respective ones of the retrieved previously classified software modules in the neighborhood; and
    clustering the given previously classified software module with one or more of the retrieved previously classified software modules having pairwise distances less than a second threshold, the second threshold being smaller than the first threshold.

12. The method of claim 1 wherein classifying the first software module comprises comparing distance metrics between static features in the extracted feature set of the first software module and corresponding static features of previously classified software modules in the plurality of clusters.

13. The method of claim 12 further comprising classifying the first software module as benign based at least in part on determining that the distance metrics between the static features in the extracted feature set of the first software module and corresponding static features of a given cluster of software modules previously classified as benign is below a given threshold.

14. The method of claim 13 further comprising classifying the first software module as potentially malicious based at least in part on:
   determining that the distance metrics between the static features in the extracted feature set of the first software module and corresponding static features of a given cluster of software modules previously classified as potentially malicious is below a first threshold; and
   determining that the distance metrics between the static features, the behavior features and the context features in the extracted feature set of the first software module and corresponding features of the given cluster of software modules previously classified as potentially malicious is below a second threshold.

15. The method of claim 1 wherein modifying access by the given client device to the first software module comprises at least one of:
   removing the first software module from a memory or storage of the given client device;
   preventing the given client device from obtaining the first software module; and
   causing the first software module to be opened in a sandboxed application environment on the given client device.

16. The method of claim 1, wherein the one or more behavior features are associated with actions performed by the first software module installed on said at least one of the plurality of client devices and wherein the one or more context features are associated with installation of the first software module on said at least one of the plurality of client devices.

17. A computer program product comprising a non-transitory processor-readable storage medium having stored therein program code of one or more software programs, wherein the program code when executed by at least one processing device cause the at least one processing device:
   to obtain at least a first software module not classified as benign or potentially malicious;
   to extract a set of features associated with the first software module, the set of features comprising one or more static features, one or more behavior features and one or more context features;
   to compute distance metrics between the extracted feature set of the first software module and feature sets of a plurality of clusters, the plurality of clusters comprising: one or more clusters of software modules previously classified as benign and exhibiting a first threshold level of similarity relative to one another; and one or more clusters of software modules previously classified as potentially malicious and exhibiting a second threshold level of similarity relative to one another;
   to classify the first software module as belonging to a given one of the plurality of clusters based at least in part on the computed distance metrics; and
   to modify access by a given client device to the first software module responsive to the given cluster being one of the one or more clusters of software modules previously classified as potentially malicious;
   wherein extracting the set of features associated with the first software module comprises:
      extracting the one or more static features from the first software module; and
      obtaining the one or more behavior features and the one or more context features of the first software module from at least one of a plurality of client devices on which the first software module is installed.

18. The computer program product of claim 17 wherein the program code when executed by the processing device further causes the processing device to determine the plurality of clusters by computing pairwise distances for pairs of previously classified software modules utilizing a density-based spatial clustering of applications with noise (DBSCAN) clustering algorithm, and wherein computing the pairwise distances comprises:
   indexing the previously classified software modules based on a subset of the extracted features, the subset of extracted features being numerical features;
   building a range query based on the indexing;
   utilizing the range query with a first threshold to retrieve a subset of the previously classified software modules in a neighborhood of a given one of the previously classified software modules;
   computing pairwise distances between the given previously classified software module and respective ones of the retrieved previously classified software module in the neighborhood; and
   clustering the given previously classified software module with one or more of the retrieved previously classified software modules having pairwise distances less than a second threshold.

19. An apparatus comprising:
   at least one processing device comprising a processor coupled to a memory;
   the at least one processing device being configured:
      to obtain at least a first software module not classified as benign or potentially malicious;
      to extract a set of features associated with the first software module, the set of features comprising one or more static features, one or more behavior features and one or more context features;
      to compute distance metrics between the extracted feature set of the first software module and feature sets of a plurality of clusters, the plurality of clusters comprising: one or more clusters of software modules previously classified as benign and exhibiting a first threshold level of similarity relative to one another; and one or more clusters of software modules previously classified as potentially malicious and exhibiting a second threshold level of similarity relative to one another;
      to classify the first software module as belonging to a given one of the plurality of clusters based at least in part on the computed distance metrics; and
      to modify access by a given client device to the first software module responsive to the given cluster being one of the one or more clusters of software modules previously classified as potentially malicious;
   wherein extracting the set of features associated with the first software module comprises:
      extracting the one or more static features from the first software module; and
      obtaining the one or more behavior features and the one or more context features of the first software module from at least one of a plurality of client devices on which the first software module is installed.

20. The apparatus of claim 19 wherein the at least one processing device is further configured to determine the plurality of clusters by computing pairwise distances for pairs of previously classified software modules utilizing a density-based spatial clustering of applications with noise (DBSCAN) clustering algorithm, and wherein computing the pairwise distances comprises:
  indexing the previously classified software modules based on a subset of the extracted features, the subset of extracted features being numerical features;
  building a range query based on the indexing;
  utilizing the range query with a first threshold to retrieve a subset of the previously classified software modules in a neighborhood of a given one of the previously classified software modules;
  computing pairwise distances between the given previously classified software module and respective ones of the retrieved previously classified software modules in the neighborhood; and
  clustering the given previously classified software module with one or more of the retrieved previously classified software modules having pairwise distances less than a second threshold.

* * * * *